United States Patent
Park

(10) Patent No.: US 9,223,540 B2
(45) Date of Patent: Dec. 29, 2015

(54) ELECTRONIC DEVICE AND METHOD FOR VOICE RECOGNITION UPON CHARGE TRANSFER

(71) Applicant: Samsung Electronics Co. Ltd., Suwon-si, Gyeonggi-do (KR)

(72) Inventor: Hyung-Jin Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 13/962,174

(22) Filed: Aug. 8, 2013

(65) Prior Publication Data

US 2014/0122090 A1 May 1, 2014

(30) Foreign Application Priority Data

Oct. 30, 2012 (KR) ..................... 10-2012-0121099

(51) Int. Cl.
| | |
|---|---|
| G10L 21/00 | (2013.01) |
| G10L 25/00 | (2013.01) |
| G10L 15/00 | (2013.01) |
| G06F 3/16 | (2006.01) |
| H04M 1/725 | (2006.01) |

(52) U.S. Cl.
CPC ........... *G06F 3/167* (2013.01); *H04M 1/72522* (2013.01); *H04M 2250/12* (2013.01); *H04M 2250/74* (2013.01)

(58) Field of Classification Search
CPC ... G10L 15/22; G10L 15/26; H04M 2201/40; G06F 3/167

USPC ................................. 704/275, 231–257
See application file for complete search history.

(56) References Cited

U.S. PATENT DOCUMENTS

| | | | |
|---|---|---|---|
| 8,694,522 B1* | 4/2014 | Pance ............................ 707/758 |
| 2002/0035701 A1* | 3/2002 | Casebolt et al. .............. 713/300 |
| 2003/0028382 A1* | 2/2003 | Chambers et al. ............ 704/275 |
| 2006/0132447 A1* | 6/2006 | Conrad ......................... 345/168 |
| 2006/0197753 A1* | 9/2006 | Hotelling ...................... 345/173 |
| 2008/0242343 A1* | 10/2008 | Koh et al. .................. 455/550.1 |
| 2010/0080084 A1 | 4/2010 | Chen et al. |
| 2011/0237220 A1* | 9/2011 | Matsuoka ..................... 455/411 |

FOREIGN PATENT DOCUMENTS

| | | |
|---|---|---|
| CN | 101015001 A | 8/2007 |
| CN | 201667668 U | 12/2010 |
| CN | 102165521 A | 8/2011 |
| KR | 2000-0040570 A | 7/2000 |
| KR | 2003-0010432 A | 2/2003 |
| KR | 10-2011-0005937 A | 1/2011 |

* cited by examiner

*Primary Examiner* — Jesse Pullias
(74) *Attorney, Agent, or Firm* — Jefferson IP Law, LLP

(57) ABSTRACT

An electronic device and a method for recognizing a voice are provided. An operating method of the electronic device includes detecting, at least one of two or more first sensors disposed in a preset region, detecting an amount of charge transfer over a preset value, when detecting the amount of the charge transfer over the preset value, detecting, at one of two or more second sensors disposed in a preset distance from two or more microphones, an object in a preset distance; and collecting, at one of the two or more microphones, the one disposed in a preset distance from the second sensor detecting the object in the preset distance, a voice.

23 Claims, 11 Drawing Sheets

ELECTRONIC DEVICE AND METHOD FOR VOICE RECOGNITION UPON CHARGE TRANSFER

CROSS-REFERENCE TO RELATED APPLICATION(S)

This application claims the benefit under 35 U.S.C. §119(a) of a Korean patent application filed Office on Oct. 30, 2012 in the Korean Intellectual Property and assigned Serial No. 10-2012-0121099, the entire disclosure of which is hereby incorporated by reference.

TECHNICAL FIELD

The present disclosure relates to an electronic device and a method for recognizing a voice.

BACKGROUND

Many electronic devices allow voice recognition which performs a preset operation by recognizing a user's voice so that a user does not have to input a particular command to the electronic device. For example, using voice recognition, the electronic device can confirm that the voice input is a command instructing to perform a particular function. The electronic device may then automatically carry out the function corresponding to the confirmed command.

However, to use the electronic device including the voice recognition function, the user needs to execute an application for initiating the voice recognition function. For example, to initiate the voice recognition function, the user needs to select and execute the application connected to the voice recognition function among multiple applications stored in the electronic device. Further, the electronic device has limits in detecting motions of the electronic device and the user with an acceleration sensor and a proximity sensor in order to initiate the voice recognition function. When not operating over a preset time, the electronic device enters a deep-sleep mode to save its battery power. An electronic device according to the related art does not allow the voice recognition in the deep-sleep mode. In addition, the electronic device of the voice recognition capability does not distinguish a microphone receiving more user voice from other microphones.

In this respect, what is needed is an electronic device for distinguishing the microphone receiving more user voice from other microphones among two or more microphones, and allowing the voice recognition even in the deep-sleep mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and/or disadvantages and to provide at least the advantages described below. Accordingly, an aspect of the present disclosure to provide an apparatus and a method for setting a microphone capable of receiving more user voice to a main microphone, without having to fix the main microphone and a sub microphone among two or more microphones.

Another aspect of the present disclosure is to provide an apparatus and a method for effectively blocking ambient noise such that a main microphone primarily receives a voice and a sub microphone primarily cancels noise.

Another aspect of the present disclosure is to provide an apparatus and a method for recognizing a user's voice by activating sensors even in a deep-sleep mode.

Another aspect of the present disclosure is to provide an apparatus and a method for effectively blocking ambient noise by turning on two or more microphones even when another microphone is connected.

Another aspect of the present disclosure is to provide an apparatus and a method for preventing a possible malfunction of the related art when an acceleration sensor and a proximity sensor are used, by use of a grip sensor and a proximity sensor.

Another aspect of the present disclosure is to provide an apparatus and a method for effectively distinguishing a main microphone and a sub microphone by employing proximity sensors within a preset distance from two or more microphones respectively.

In accordance with an aspect of the present disclosure, an operating method of an electronic device is provided. The method includes detecting, at least one of two or more first sensors disposed in a preset region, an amount of charge transfer greater than a preset value, when the amount of the charge transfer is greater than the preset value, detecting, at one of two or more second sensors disposed in a preset distance from two or more microphones, an object in a preset distance from the electronic device, and receiving a voice at one of the two or more microphones disposed in the preset distance from the second sensor detecting the object in the preset distance.

In accordance with another aspect of the present disclosure, the operating method may further include when the at least one of the two or more first sensors detects the amount of the charge transfer greater than the preset value, operating the two or more second sensors.

In accordance with another aspect of the present disclosure, the operating method may further include when the one of the two or more second sensors detects the object in the preset distance, operating the two or more microphones.

In accordance with another aspect of the present disclosure, the operating method may further include analyzing the detected voice, recognizing a command corresponding to the detected voice, and performing an operation according to the recognized command.

In accordance with another aspect of the present disclosure, the operating method may further include determining whether at least one second sensor other than the second sensor disposed in the preset distance from the microphone receiving the voice detects an object in the preset distance from the electronic device.

In accordance with another aspect of the present disclosure, the operating method may further include when the at least one second sensor other than the second sensor disposed in the preset distance from the microphone receiving the voice detects the object, receiving the voice at the microphone disposed in the preset distance from the second sensor detecting the object.

In accordance with another aspect of the present disclosure, an electronic device is provided. The electronic device includes two or more first sensors disposed in a preset region, wherein one of the first sensors detects an amount of charge transfer greater than a preset value, two or more second sensors disposed in a preset distance from two or more microphones and detecting an object in a preset distance from the electronic device when the first sensor detects the amount of the charge transfer over the preset value, and two or more microphones, one of which is disposed in the preset distance from the second sensor detecting the object and receives a voice.

In accordance with another aspect of the present disclosure, the two or more first sensors may operate while the electronic device is in a deep-sleep mode.

In accordance with another aspect of the present disclosure, the first sensor may be a grip sensor.

In accordance with another aspect of the present disclosure, the second sensor may be a proximity sensor.

In accordance with another aspect of the present disclosure, the two or more second sensors may operate when the one first sensor detects the amount of the charge transfer greater than the preset value.

In accordance with another aspect of the present invention, the two or more microphones may operate when one of the two or more second sensors detects the object.

In accordance with another aspect of the present disclosure, the one of the two or more microphones disposed in the preset distance from the second sensor detecting the object, may primarily receive the voice.

In accordance with another aspect of the present disclosure, at least one microphone other than the one microphone of the two or more microphones disposed in the preset distance from the second sensor detecting the object, may primarily cancel noise.

In accordance with another aspect of the present disclosure, the electronic device may further include a processor unit for analyzing the detected voice, for recognizing a command corresponding to the detected voice, and for performing an operation according to the recognized command.

In accordance with another aspect of the present invention, at least one second sensor other than the second sensor disposed in the preset distance from the microphone receiving the voice, determines whether an object is detected in a preset distance from the electronic device.

In accordance with another aspect of the present invention, the electronic device may further include a microphone disposed in the preset distance from the second sensor detecting the object and for receiving the voice.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
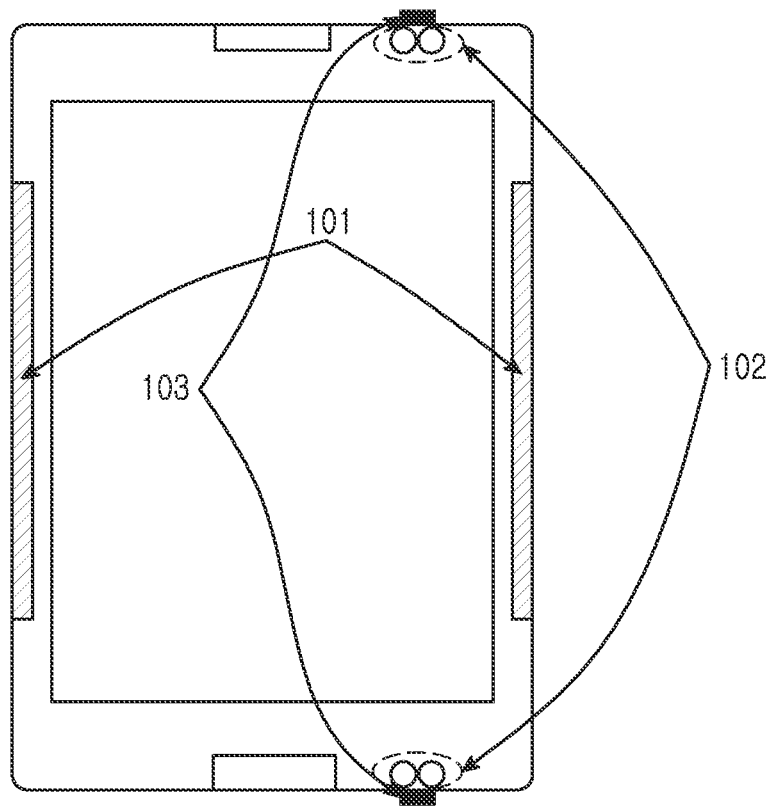
FIG. 1 illustrates an electronic device for recognizing a voice according to an embodiment of the present disclosure.

FIG. 1 depicts an electronic device for recognizing a voice according to an embodiment of the present disclosure.

Referring FIG. 1, the electronic device for recognizing the voice can include at least one first sensor 101, at least one second sensor 102, and at least one microphone 103.

The first sensor 101 can be disposed in a preset region to detect an amount of charge transfer over a preset value. The first sensor 101 can be at least one grip sensor disposed in a preset region and detecting the charge transfer amount over a preset value from the outside to the inside of the electronic device. For example, when a user holds the electronic device, the user mostly grips sides of the electronic device. The first sensor 101 is disposed in left and right outer shells of the sides of the electronic device and detects the charge transfer amount from the user's hand. The at least one first sensor 101 is disposed in the preset region and detects whether the amount of the charge from the user's hand transfers over the preset value. While it is assumed that the first sensor 101 is disposed in each of the left and right sides of the electronic device, the first sensor 101 may be additionally disposed in each of a top side and a bottom side of the electronic device.

The first sensor 101 can operate even when an operating mode of the electronic device is a deep-sleep mode. The first sensor 101 can determine whether the amount of the charge from the user's hand transfers over the preset value even in the deep-sleep mode of the electronic device. The sensors of an electronic device according to the related art do not operate in the deep-sleep mode of the electronic device. For example, when the electronic device does not operate over a preset time, the electronic device enters the deep-sleep mode. When the electronic device enters the deep-sleep mode, various sensors of the electronic device do not operate. Accordingly, to activate the sensors of the electronic device, the user needs to manually change the operation mode of the electronic device to wake up from the deep-sleep mode.

In contrast, the first sensor 101 can detect whether the amount of the charge over the preset value transfers from the outside to the inside of the electronic device even in the deep-sleep mode of the electronic device. The electronic device includes a sensor hub operable with low power separately from a Central Processing Unit (CPU) for controlling operations of the electronic device, and thus can control the first sensor 101 and the second sensor 102. As a result, the present electronic device can always operate the sensor hub for controlling the first sensor 101 and the second sensor 102 with low power even in the deep-sleep mode.

The second sensor 102 can be disposed within a preset distance from the at least two microphones 103 and detect an object within a preset distance. The second sensor 102 can employ a proximity sensor disposed within a preset distance from the two or more microphones 103 and detect a location of the object in the preset distance. The electronic device may employ a number of second sensors 102 equal to the at least two microphones 103, and the second sensors 102 may be disposed in the preset distance from the at least two microphones 103, and detect the object in the preset distance. For example, the second sensor disposed at the top of the electronic device can be disposed within the preset distance from the microphone at the same top side and detect whether the object is placed in a preset distance. The second sensor 102 may include an infrared Light Emitting Diode (LED) in a light emitting part of the second sensor 102, and detect whether the object is placed in the preset distance by detecting an infrared LED reflected from an ambient object through the light receiving part. The second sensor 102 can operate when at least one of the two or more first sensors 101 detects the charge amount over the preset value. The second sensor 102 is deactivated and then activated when the first sensor 101 detects the charge amount over the preset value.

As described above, by use of the first sensor 101 and the second sensor 102, the electronic device can prevent a possible malfunction when an acceleration sensor and a proximity sensor are used in the related art. For example, when the user uses the electronic device and then leaves the electronic device alone, the electronic device according to the related art is subject to an unintended malfunction such that the action for throwing the electronic device away activates the acceleration sensor and the moving object, rather than the user's mouth, activates the proximity sensor. In contrast, the electronic device as described herein can replace the acceleration sensor with the grip sensor being the first sensor 101, and thus commence the voice recognition only when the charge from the user's hand transfers into the electronic device.

The at least two microphones 103 can be disposed within the preset distance from the second sensors 102 respectively to receive the voice input. The microphones 103 can be disposed within the preset distance from the at least two second sensors 102 respectively, and one microphone in the preset distance from the second sensor detecting the object among the at least two second sensors 102 can receive ambient noise. For example, the electronic device may include the microphones at the top and at the bottom respectively. When the second sensor in the preset distance from the microphone at the top detects the object, the microphone at the top can receive the voice around the top side. One microphone in the preset distance from the second sensor detecting the object in the preset distance among the at least two second sensors 102 can primarily receive the voice. The microphone at the top can primarily receive the voice.

At least one other microphone excluding the microphone in the preset distance from the second sensor detecting the object in the preset distance among the at least two second sensors 102, can primarily cancel the noise. The microphone at the bottom of the electronic device can primarily cancel the noise, rather than receiving the ambient noise. The microphone 103 can operate when one of the two or more second sensors 102 detects the object in the preset distance. The two or more microphones are deactivated and then activated when one of the second sensors 102 detects the object in the preset distance. The microphone disposed in the preset distance from the second sensor detecting the object in the preset distance among the two or more second sensors 102, primarily receive the voice, and the other microphones primarily cancel the ambient noise.

The electronic device can set the microphone capable of receiving more user voice to the main microphone, rather than fixing the main microphone and the sub microphone of the two or more microphones. The second sensor 102 of the electronic device can detect a perimeter of the mouth producing the user voice in real time and thus set the microphone in the preset distance from the second sensor detecting the user's mouth to the main microphone, rather than fixing one of the two or more microphones of the electronic device as the main microphone and the other microphone as the sub microphone. Similarly, the ambient noise can be effectively blocked such that the main microphone chiefly receives the voice and the sub microphone chiefly cancels the ambient noise. The electronic device according to the related art typically includes only the second sensor and accordingly cannot detect the user's mouth of which the position changes in real time. In contrast, the electronic device as described herein includes the second sensors 102 in the preset distance from the at least two microphones 103 respectively and accordingly does not fix the function of the microphone. The proximity sensor 102 and the microphone 103 can be fabricated and mounted as a single integrated module. The proximity sensor and the microphone at the top of the electronic device can be fabricated and mounted as a single integrated module, and the proximity sensor and the microphone at the bottom of the electronic device can be fabricated and mounted as a single integrated module.

The electronic device can analyze the detected voice, recognize the command corresponding to the detected voice, and then perform a preset operation according to the recognized command. The present electronic device as described herein can recognize the user's voice and conduct the preset operation according to the command corresponding to the detected voice. In the related art, the user needs to select and execute the application of the voice recognition in order to recognize the voice in the electronic device. The electronic device according to the related art receives an application execution request for the voice recognition from the user and then recognizes the voice from the user only when the corresponding application is executed. However, even when a separate application is not executed in the present electronic device, the first sensor and the second sensor operate and the microphone receiving the user's voice most among the at least two microphones of the electronic device can receive the user voice. Accordingly, the user can perform the user's intended operation in the electronic device by merely inputting the voice as defined in the electronic device without an additional interaction. When a voice reception condition is satisfied in the electronic device, the application for the voice recognition can be automatically run in a background of the electronic device and then the received voice command can be executed. For example, when the microphone at the top of the electronic device receives the voice "play a music", the electronic device can automatically run the application A for recognizing the voice in the background, recognize the received voice command "play music", and play the music stored therein.

The electronic device determines whether at least one sensor excluding the second sensor in the preset distance from the microphone receiving the voice, detects the object in the preset distance. When the at least one sensor excluding the second sensor in the preset distance from the microphone receiving the voice detects the object in the preset distance, the microphone in the preset distance from the second sensor detecting the object in the preset distance can receive the voice. The electronic device can change the main microphone capable of receiving more user voice, without having to fix the main microphone and the sub microphone of the two or more microphones.

Figure 2:
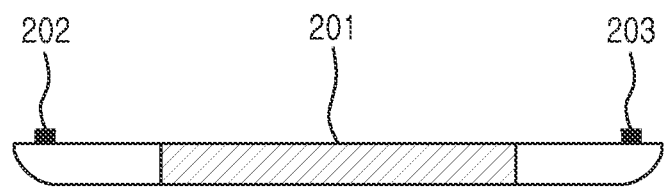
FIG. 2 illustrates one side of an electronic device including two microphones according to an embodiment of the present disclosure.

FIG. 2 depicts one side of an electronic device including two microphones according to an embodiment of the present disclosure.

Referring to FIG. 2, the electronic device may include a first sensor 201 in each of left and right outer shells, and a second sensor (not shown) at each of the top and the bottom. The first sensor 201 can be added to the top and the bottom of the electronic device. When the electronic device is designed so that the user can grip the outer shell of the electronic device, the first sensor 201 can also be disposed at a corner. Two or more second sensors may be disposed according to the number of the microphones, in a preset distance from the microphone of the electronic device. Hereafter, it is assumed that the first sensors 201 are disposed in the left and right outer shells of the electronic device, and the second sensors are disposed at the top and the bottom of the electronic device.

First, the electronic device can determine whether the first sensors 201 disposed in the left and right outer shells detect the amount of the charge transfer over a preset value. The electronic device can determine whether the two first sensors 201 being the grip sensors detect the amount of the charge transfer over the preset value from the outside to the inside of the electronic device. For example, when the user holds the electronic device in the hand, the electronic device can detect the amount of the charge transfer over the preset value from the outside to the inside of the electronic device. When conductive objects other than the user's hand touches the first sensor 201, the electronic device cannot detect the amount of the charge transfer from the outside to the inside of the electronic device and thus does not operate.

Next, the electronic device operates the two second sensors. The electronic device operates the second sensor disposed in the preset distance from the first microphone 202 at the top of the electronic device, and the second sensor disposed in the preset distance from the second microphone 203 at the bottom of the electronic device. The electronic device can detect whether the second sensors detect the object in a preset distance. The electronic device can operate the second sensor disposed in the preset distance from the first microphone 202 and the second sensor disposed in the preset distance from the second microphone 203, and thus detect whether the object is placed around the microphones 202 and 203. For example, when the user's mouth is near the first microphone 202, the second sensor disposed in the preset distance from the first microphone 202 can detect the object in the preset distance.

Next, the electronic device can receive the voice using the microphone in the preset distance from the second sensor detecting the object. For example, when the second sensor in the preset distance from the first microphone 202 detects the object in the preset distance, the electronic device can operate the first microphone 202 and the second microphone 203 and then receive the voice using the first microphone 202. The electronic device can receive the ambient voice chiefly using the first microphone 202 and cancel the ambient noise chiefly using the second microphone 203. The second sensor and the microphone can be fabricated and mounted as a single integrated module. The proximity sensor and the microphone 202 at the top of the electronic device can be fabricated and mounted as a single integrated module, and the proximity sensor and the microphone 203 at the bottom of the electronic device can be fabricated and mounted as a single integrated module.

As such, the electronic device can set the microphone capable of receive more user voice as the main microphone, rather than fixing the main microphone and the sub microphone of the two or more microphones. The second sensor of the electronic device can detect the motion of the object in real time and the electronic device can set the microphone in the preset distance from the second sensor detecting the user's mouth to the main microphone, rather than fixing one of the two microphones as the main microphone and the other microphone as the sub microphone. Similarly, the ambient noise can be effectively blocked such that the main microphone chiefly receives the voice and the sub microphone chiefly cancels the noise. The electronic device according to the related art typically includes only the second sensor and thus cannot effectively detect the user's mouth, the position of which may change in real time. In contrast, the electronic device as shown in FIG. 2 includes the second sensors in the preset distance from the two microphones 202 and 203 respectively and thus does not fix the function of the microphone.

Next, the electronic device can analyze the detected voice, recognize the command corresponding to the detected voice, and then perform a preset operation according to the recognized command. The electronic device can recognize the user's voice and conduct the preset operation according to the command corresponding to the detected voice. When the voice reception condition is satisfied in the electronic device, the application for the voice recognition can be automatically run in the background of the electronic device and then the received voice command can be executed. For example, when the microphone at the top of the electronic device receives the voice "call A", the electronic device can automatically run the application A for recognizing the voice in the background, recognize the received voice command "call A", and try the call to the phone number of A stored in the electronic device.

In the related art, the user needs to select and execute the application of the voice recognition in order to recognize the voice in the electronic device. The electronic device according to the related art receives the application execution request for the voice recognition from the user and then recognizes the voice from the user only when the corresponding application is executed. In contrast, even when the separate application is not executed in the electronic device as described herein, the first sensor and the second sensor operate and the microphone received the user's voice most among the two microphones of the electronic device can receive the user voice. Accordingly, the user can perform the user's intended operation in the electronic device by merely inputting the voice as defined in the electronic device without an additional interaction.

The electronic device determines whether the other second sensor excluding the second sensor in the preset distance from the microphone receiving the voice detects the object in the preset distance. The microphone in the preset distance from the second sensor detecting the object in the preset distance can receive the voice. The electronic device can change the main microphone capable of receiving more user voice, without having to fix the main microphone and the sub microphone of the two microphones.

Figure 3:
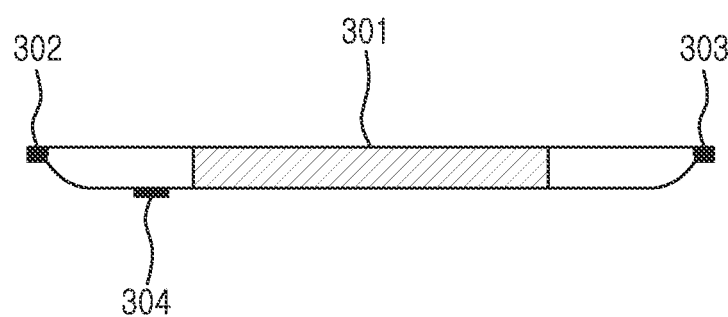
FIG. 3 illustrates one side of an electronic device including three microphones according to an embodiment of the present disclosure.

FIG. 3 depicts one side of an electronic device including three microphones according to an embodiment of the present disclosure.

Referring to FIG. 3, the electronic device can include a first sensor 301 in each of left and right outer shells, and a second sensor (not shown) at each of the top side, the bottom side, and the back side. The first sensor 301 can be added to the top and the bottom of the electronic device. When the electronic device is designed so that the user can hold the outer shell of the electronic device, the first sensor 301 can also be disposed at a corner. At least two second sensors may be disposed according to the number of the microphones, in a preset distance from the microphone of the electronic device. Hereafter, it is assumed that the first sensors 301 are disposed in the left and right outer shells of the electronic device, and the second sensors are disposed at the top, the bottom, and the back of the electronic device.

First, the electronic device can determine whether the first sensors 301 disposed in the left and right outer shells detect the amount of the charge transfer over the preset value. The electronic device can determine whether the two first sensors 301 being the grip sensors detect the amount of the charge transfer over the preset value from the outside to the inside of the electronic device. For example, when the user grips the electronic device with a hand, the electronic device can detect the amount of the charge transfer over the preset value from the outside to the inside. When conductive objects other than the user's hand touch the first sensor 301, the electronic device cannot detect the amount of the charge transfer from the outside to the inside of the electronic device and thus does not operate.

The first sensor 301 can operate even in the deep-sleep mode of the electronic device. The first sensor 301 can detect the amount of the charge transfer over the preset value from the user's hand even in the deep-sleep mode of the electronic device. The various sensors of the electronic device according to the related art do not operate in the deep-sleep mode of the electronic device. For example, the electronic device enters the deep-sleep mode when not operating over a preset time. When the electronic device enters the deep-sleep mode, the various sensors of the electronic device do not operate.

Accordingly, to activate the sensors of the electronic device, the user needs to manually change the operation mode of the electronic device to wake up from the deep-sleep mode. In contrast, the first sensor 301 can detect the amount of the charge transfer over the preset value from the outside to the inside of the electronic device even in the deep-sleep mode of the electronic device. The electronic device as described herein includes the sensor hub operable with low power, separately from the CPU for controlling the operations of the electronic device, and thus can control the first sensor 301 and the second sensor. Accordingly, the electronic device can always operate the sensor hub for controlling the first sensor 301 and the second sensor with low power even in the deep-sleep mode.

Next, the electronic device operates the three second sensors. The electronic device operates the second sensor disposed in the preset distance from the first microphone 302 at the top of the electronic device, the second sensor disposed in the preset distance from the second microphone 303 at the bottom of the electronic device, and the second sensor disposed in the preset distance from the second microphone 304 at the back of the electronic device. The electronic device can determine whether the second sensors detect the object in a preset distance. The electronic device can determine whether the object is placed around the microphones 302, 303, and 304 by operating the second sensor disposed in the preset distance from the first microphone 302, the second sensor disposed in the preset distance from the second microphone 303, and the second sensor disposed in the preset distance from the second microphone 304. For example, when the user's mouth is near the first microphone 302, the second sensor disposed in the preset distance from the first microphone 302 can detect the object in the preset distance.

Next, the electronic device detecting the object in the preset distance using the second sensor can receive the voice using the microphone in the preset distance from the second sensor detecting the object. For example, when the second sensor in the preset distance from the first microphone 302 detects the object in the preset distance, the electronic device can operate the first microphone 302, the second microphone 303, and the third microphone 304, and then receive the ambient voice using the first microphone 302. The electronic device can receive the voice chiefly using the first microphone 302 and cancel the ambient noise chiefly using the second microphone 303 and the third microphone 304.

The second sensor and the microphone can be fabricated and mounted as a single integrated module. The proximity sensor and the microphone 302 at the top of the electronic device can be fabricated and mounted as a single integrated module, and the proximity sensor and the microphone 303 at the bottom of the electronic device can be fabricated and mounted as a single integrated module.

As such, the electronic device can set the microphone capable of receiving more user voice to the main microphone, rather than fixing the main microphone and the sub microphone of the three microphones. The second sensor of the electronic device can detect the motion of the object in real time and the electronic device can set the microphone in the preset distance from the second sensor detecting the user's mouth to the main microphone, rather than fixing one of the three microphones as the main microphone and the other two microphone as the sub microphones. Similarly, the ambient noise can be effectively blocked such that the main microphone chiefly receives the voice and the sub microphone chiefly cancels the noise. The electronic device according to the related art typically includes only the second sensor and thus cannot effectively detect the user's mouth of which the position changes in real time. In contrast, the electronic device as described herein includes the second sensors in the preset distance from the three microphones 302, 303, and 304 respectively and thus does not fix the function of the microphone.

Next, the electronic device can analyze the detected voice, recognize the command corresponding to the detected voice, and then perform the preset operation according to the recognized command. The electronic device can recognize the user's voice and conduct the preset operation according to the command corresponding to the detected voice. In the related art, the user needs to select and execute the application of the voice recognition in order to recognize the voice in the electronic device. The electronic device according to the related art receives the application execution request for the voice recognition from the user and then recognizes the voice from the user only when the corresponding application is executed. However, even when the separate application is not executed in the electronic device as described herein, the first sensor and the second sensor operate and the microphone receiving the user's voice most among the three microphones of the electronic device can receive the user voice. Accordingly, the user can perform his/her intended operation in the electronic device by merely inputting the voice as set in the electronic device without an additional interaction. When the voice reception condition is satisfied in the electronic device, the application for the voice recognition can be automatically run in the background of the electronic device and then the received voice command can be executed. For example, when the microphone at the top of the electronic device receives the voice "play a video", the electronic device can automatically run the application A for recognizing the voice in the background, recognize the received voice command "play video", and play the video stored in the electronic device.

The electronic device determines whether the other two second sensors excluding the second sensor in the preset distance from the microphone receiving the voice detect the object in the preset distance. The microphone in the preset distance from the second sensor detecting the object in the preset distance can receive the voice. The electronic device can change the main microphone capable of receiving more user voice, without having to fix the main microphone and the sub microphone among the three microphones.

Figure 4:
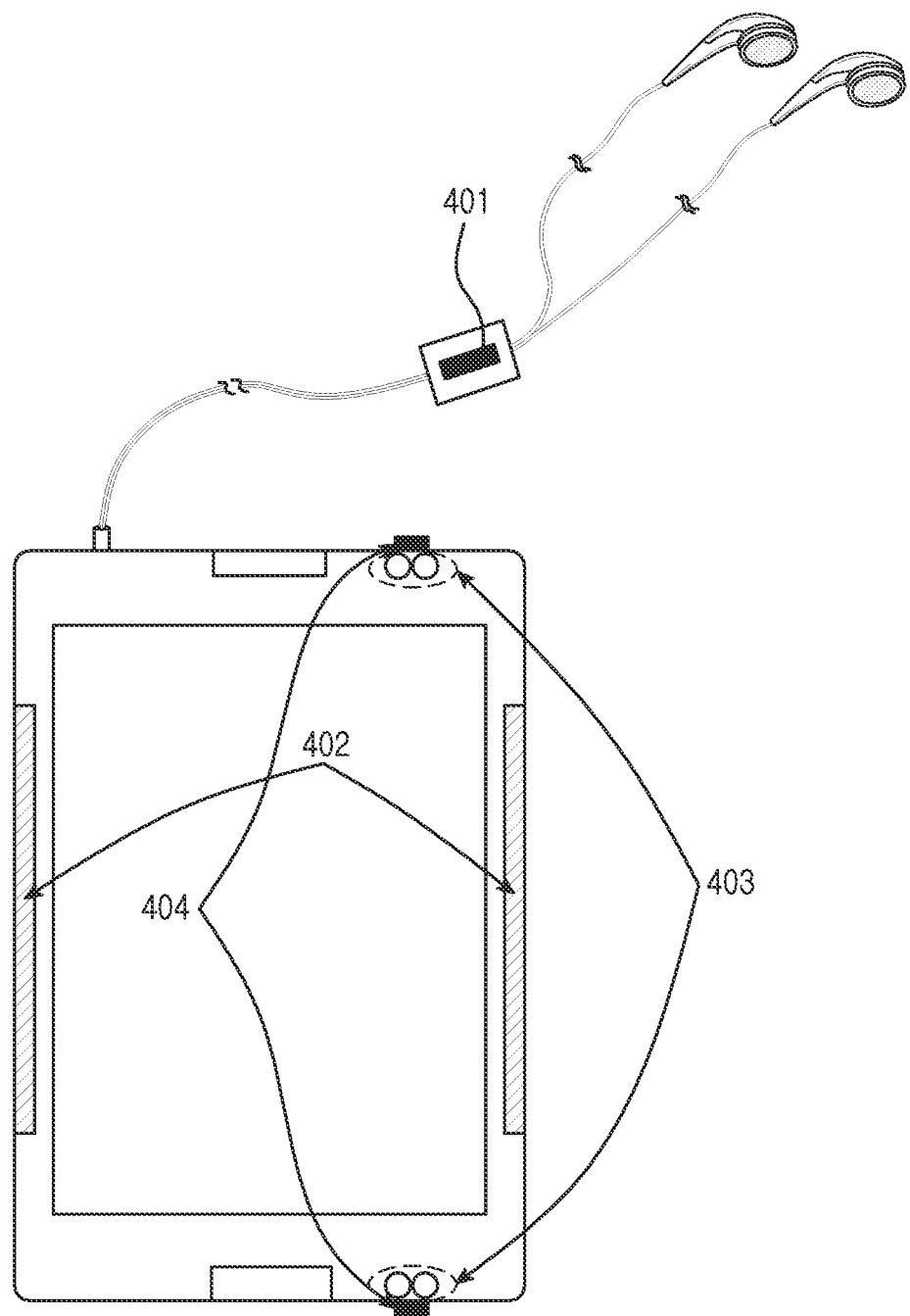
FIG. 4 illustrates an operating method of an electronic device when an earphone including a microphone is connected to the electronic device according to an embodiment of the present disclosure.

FIG. 4 depicts the operations of an electronic device when an earphone including a microphone is connected to the electronic device according to an embodiment of the present disclosure.

Referring to FIG. 4, the earphone can be connected to the electronic device. When the earphone including an earphone microphone 401 is connected to the electronic device, the electronic device can send the voice of the call to a speaker of the earphone through a cable of the earphone. The electronic device can send the sound such as music being played, to the speaker of the earphone through the cable of the earphone. Hereafter, it is assumed that the earphone connected to the electronic device includes the earphone microphone 401, and the electronic device includes first sensors 402 in left and right outer shells respectively, as well as two sensors 403 and two microphones 404 at the top and the bottom.

The earphone is connected to the electronic device. The electronic device forwards the voice and the sound to the speaker of the earphone using the earphone cable. The microphone 401 of the earphone can receive the user's voice during the call.

The electronic device confirming the connection of the earphone can determine whether the first sensors 402 in the left and right outer shells detect the amount of the charge transfer over the preset value. The electronic device can determine whether the two first sensors 402 being the grip sensors detect the amount of the charge transfer over the preset value from the outside to the inside of the electronic device. Upon detecting the amount of the charge transfer over the preset value, the electronic device can receive the voice using the microphone 401 of the connected earphone. The electronic device can receive the user's voice around the microphone 401 using the microphone 401 of the earphone. Concurrently, the electronic device can cancel the noise around the two microphones 404 by activating the two microphones 404. The electronic device can receive the user's voice around the microphone 401 using the microphone 401 of the earphone, and cancel the noise near the two microphones 404 by activating the two microphones 404.

Next, the electronic device operates the two second sensors 403. The electronic device operates the second sensor disposed in the preset distance from the first microphone at the top of the electronic device, and the second sensor disposed in the preset distance from the second microphone at the bottom of the electronic device. The electronic device operating the two second sensors can determine whether the second sensors detect the object in a preset distance. The electronic device can receive the voice near the microphone 404 using the two microphones 404 as well by detecting the user's motion varying in real time, rather than receiving the voice near the microphone 401 using only the microphone 401 of the earphone. For example, the second sensor at the top of the electronic device may detect the object while the microphone 401 of the earphone receives the voice. In this implementation, the electronic device can change the main microphone from the microphone 401 of the earphone to the microphone disposed in the preset distance from the second sensor at the top of the electronic device. The electronic device can receive the voice chiefly using the microphone disposed in the preset distance from the second sensor at the top of the electronic device, and cancel the ambient noise chiefly using the other microphone of the electronic device and the microphone 401 of the earphone. As a result, the electronic device can determine the microphone receiving more user voice as the main microphone, without having to fix the main microphone and the sub microphone among the microphone 401 of the earphone connected to the electronic device and the two microphones 404 of the electronic device. Although the microphone 401 of the earphone, which is a default microphone, is set to the main microphone, when any one of the two second sensors 403 of the electronic device detects a change in the user's motion, the electronic device can determine the microphone disposed in the preset distance from the second sensor detecting the user motion, as the main microphone.

When the earphone including the microphone is connected, the electronic device according to the related art activates only the microphone of the earphone and does not activate the other microphones. The other microphones of the electronic device are switched off and fail to cancel the ambient noise. As a result, another electronic device communicating with the electronic device connected to the earphone receives the user's voice together with the ambient noise, and thus their communication quality deteriorates. In contrast, the electronic device as described herein concurrently activates not only the microphone 401 of the earphone but also the two microphones 404, and thus effectively cancels the ambient noise.

Figure 5A:
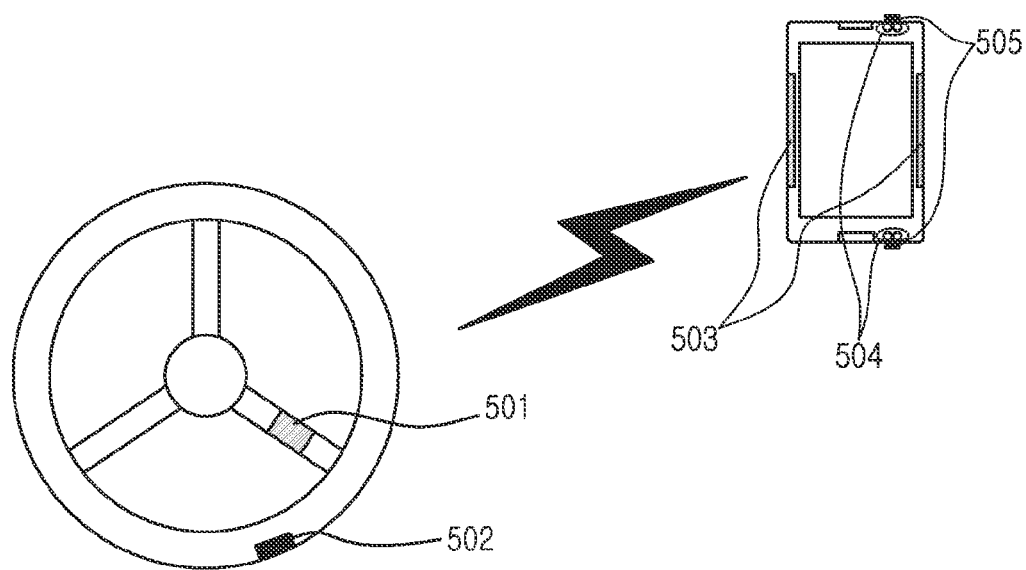
FIGS. 5A and 5B illustrate operating methods of an electronic device connected to a vehicle using short-range communication according to an embodiment of the present disclosure.
Figure 5B:
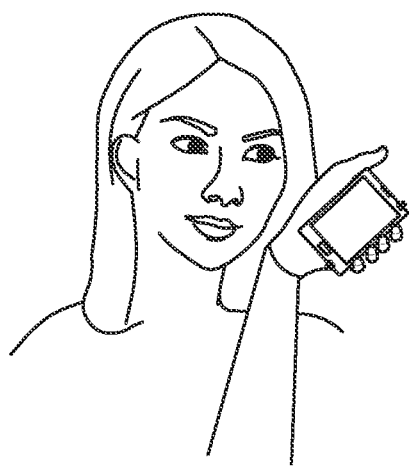

FIGS. 5A and 5B depict operations of an electronic device connected to a vehicle using short-range communication according to an embodiment of the present disclosure.

Referring to FIG. 5A, the electronic device can be connected to a vehicle using a short-range communication technology such as Zigbee or Bluetooth. Hereafter, it is assumed that the electronic device and the vehicle are connected using Bluetooth, first sensors 503 are disposed in the left and right outer shells of the electronic device, and two second sensors 504 and two microphones 505 are disposed at the top and the bottom of the electronic device.

A steering wheel of the vehicle can include a voice recognition button 501 and a microphone 502. When the voice recognition button 501 of the wheel is selected, the vehicle connected to the electronic device using Bluetooth can receive the voice near the microphone 502 using the microphone 502 of the wheel. For example, when the user driving the vehicle wants to make a call to person A stored in the electronic device, the user can press the voice recognition button 501 of the wheel of the vehicle and then make a voice command corresponding to the preset command. For example, when the user says the preset command "Call A", the electronic device connected to the vehicle using Bluetooth requests the phone call to an electronic device of the person A.

Next, the microphone 502 of the vehicle wheel and the two microphones 505 of the electronic device are activated at the same time. The microphone 502 of the vehicle wheel can primarily receive the voice around the microphone 502, and the two microphones 505 of the electronic device can cancel the ambient noise. The electronic device can effectively cancel the ambient noise using the two microphones 505. In this implementation, the electronic device according to the related art switches off the two microphones and cannot cancel the ambient noise inside the vehicle. For example, the electronic device according to the related art is subject to call quality deterioration because the noises inside and outside the vehicle are transferred to the electronic device of the person A. In contrast, the electronic device as described herein can effectively block the noises inside and outside the vehicle by concurrently activating the microphone 502 of the vehicle wheel and the two microphones 505 of the electronic device.

The electronic device can switch the main microphone from the microphone 502 of the vehicle wheel to any one of the two microphones 505. The electronic device may detect the user's motion varying in real time by activating the first sensor and the second sensor in order as described above and thus change the main microphone to the microphone closest to the user's mouth. For example, when receiving the text message in the electronic device, the user at the wheel sees the received text message while holding the electronic device in one hand. To send a reply message to the electronic device A of the received text message, the user can bring the electronic device close to his/her mouth and pronounce the preset command. The electronic device can determine the amount of the charge transfer over the preset value using the first sensor 503 and thus activate the second sensor 504.

Next, the electronic device can determine whether the second sensors 504 at the top and the bottom of the electronic device detect the object in vicinity. When the user's mouth gets close to the bottom of the electronic device, the electronic device can detect the user's motion using the second sensor 504 at the bottom of the electronic device. The electronic device can change the main microphone from the microphone of the vehicle wheel to the microphone disposed in the preset distance from the second sensor 504 of the bottom side. The microphone at the bottom of the electronic device can receive the ambient voice, and the microphone of the vehicle wheel and the microphone at the top of the electronic device can effectively cancel the ambient noise.

However, in FIG. 5A, when the user at the wheel pronounces the user command to the microphone of the electronic device, the user command may be mixed with the noise coming through an open window of the vehicle and a passenger's voice and thus the electronic device may not recognize the accurate voice. In this case, the user can hold the electronic device in person, and bring any one microphone of the electronic device close to the user's mouth, and then pronounce the intended command. Accordingly, the electronic device can accurately recognize the user's command without being affected by the noise such as noise coming through the open window of the vehicle and passenger's voice. For example, when the electronic device is placed in the car, the electronic device and the vehicle are connected using Bluetooth, and the user in the car pronounces the command to the microphone of the vehicle wheel, the user can press the voice recognition button of the vehicle and then pronounce the command of "call A". However, the user command may be mixed with the noise coming through the open window of the vehicle and the passenger's voice, and the electronic device may not recognize the accurate voice. In this case, the user can hold the electronic device in person and pronounce the user command to the microphone at the bottom of electronic device near the user's mouth. As a result, the electronic device can accurately recognize the user's command through the microphone near the user's mouth.

Figure 6:
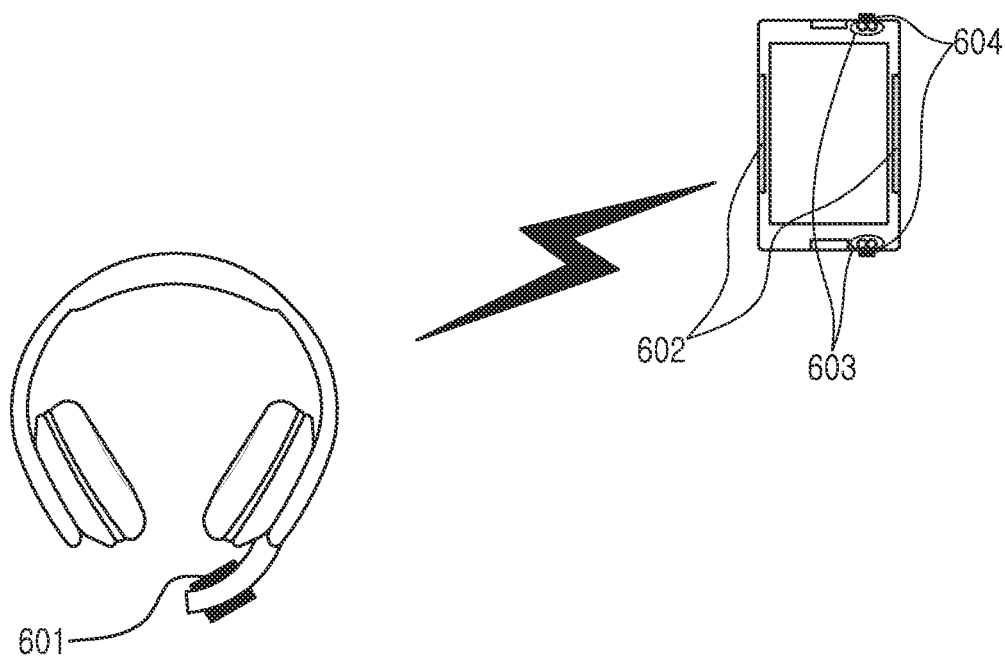
FIG. 6 illustrates an operating method of an electronic device when a headset including a microphone is connected to the electronic device according to an embodiment of the present disclosure.

FIG. 6 depicts operations of an electronic device when a headset including a microphone is connected to the electronic device according to an embodiment of the present disclosure.

Referring to FIG. 6, the electronic device can be connected to the headset including the microphone. When the headset is connected, the electronic device can send the voice of the call to a speaker of the headset through a headset cable. The electronic device can send sound (such as music) to the speaker of the headset through the headset cable. As illustrated in FIG. 6, the headset connected to the electronic device includes the headset microphone 601. The electronic device includes first sensors 602 disposed in the left and right outer shells of the electronic device, and two second sensors 603 and two microphones 604 disposed at the top and the bottom of the electronic device.

The electronic device can confirm that the headset is connected to the electronic device. The electronic device forwards the voice and the sound to the speaker of the headset through the headset cable, and can receive the user's voice in the call using the microphone 601 of the headset.

The electronic device confirming the headset connected can determine whether the first sensors 602 in the left and right outer shells of the electronic device detect the amount of the charge transfer over the preset value. The electronic device can determine whether the two first sensors 602 being the grip sensors detect the amount of the charge transfer over the preset value from the outside to the inside of the electronic device. Upon detecting the amount of the charge transfer over the preset value, the electronic device can receive the voice using the microphone 601 of the connected headset. The electronic device can receive the user's voice around the microphone 601 using the microphone 601 of the headset. Concurrently, the electronic device can cancel the noise around the two microphones 604 by activating the two microphones 604. The electronic device can receive the user's voice around the microphone 601 chiefly using the microphone 601 of the headset, and cancel the noise near the two microphones 604 chiefly using the two microphones 604 of the electronic device.

Next, the electronic device operates the two second sensors 603. The electronic device operates the second sensor disposed in the preset distance from the first microphone at the top of the electronic device, and the second sensor disposed in the preset distance from the second microphone at the bottom of the electronic device. The electronic device operating the two second sensors can determine whether the second sensors detect the object in the preset distance. The electronic device can receive the voice near the microphones 604 using the two microphones 604 as well by detecting the user's motion varying in real time, rather than receiving the voice near the microphone 601 merely using the microphone 601 of the headset.

For example, the second sensor at the bottom of the electronic device may detect the object while the microphone 601 of the headset receives the voice. In this situation, the electronic device can change the main microphone from the microphone 601 of the headset to the microphone disposed in the preset distance from the second sensor at the bottom of the electronic device. The electronic device can receive the voice chiefly using the microphone disposed in the preset distance from the second sensor at the bottom of the electronic device, and cancel the ambient noise chiefly using the other microphone of the electronic device and the microphone 601 of the headset. As a result, the electronic device can determine the microphone receiving more user voice as the main microphone, without having to fix the main microphone and the sub microphone among the microphone 601 of the headset connected to the electronic device and the two microphones 604 of the electronic device. Although the microphone 601 of the headset, which is the default microphone, is set to the main microphone, when any one of the two second sensors 603 of the electronic device detects the user's motion change, the electronic device can determine the microphone disposed in the preset distance from the second sensor detecting the user motion, as the main microphone.

The second sensor and the microphone can be fabricated and mounted as a single integrated module. The proximity sensor and the microphone at the top of the electronic device can be fabricated and mounted as a single integrated module, and the proximity sensor and the microphone at the bottom of the electronic device can be fabricated and mounted as a single integrated module.

When the headset including the microphone is connected, the electronic device according to the related art activates only the microphone of the headset and does not activate the other microphones. The other microphones of the electronic device according to the related art are switched off and fail to cancel the ambient noise. As a result, another electronic device communicating with the electronic device connected to the headset receives the user's voice together with the ambient noise, and thus the communication quality deteriorates. In contrast, the electronic device as described herein simultaneously activates not only the microphone 601 of the headset but also the two microphones 604, and thus effectively cancels the ambient noise.

Figure 7:
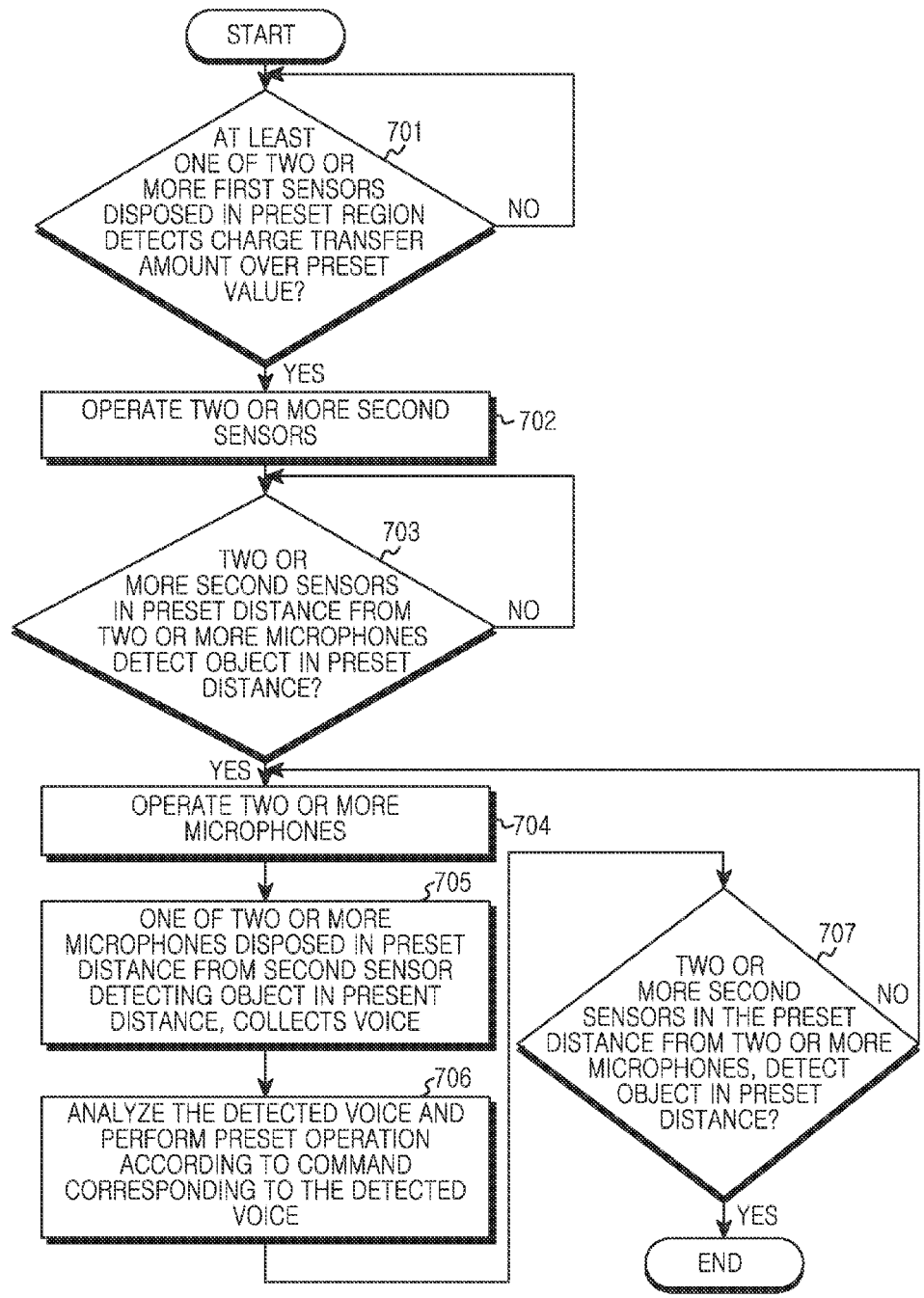
FIG. 7 illustrates operations of an electronic device according to an embodiment of the present disclosure.

FIG. 7 is a flowchart of operations of an electronic device according to an embodiment of the present disclosure.

Referring to FIG. 7, the electronic device determines whether at least one of the two or more first sensors disposed in the preset region detects the amount of the charge transfer over the preset value at operation 701. The electronic device can determine whether the two or more first sensors being the grip sensors detect the amount of the charge transfer over the preset value from the outside to the inside of the electronic device. For example, when the user holds the electronic device in the hand, the electronic device can detect the amount of the charge transfer over the preset value from the outside to the inside. When other conductive objects besides the user's hand touch the first sensor, the electronic device cannot detect the amount of the charge transfer from the outside to the inside of the electronic device and thus does not operate.

When the electronic device detects the amount of the charge transfer over the preset value at operation 701, the electronic device operates the two or more second sensors at operation 702. The second sensors can be disposed within the preset distance from the two or more microphones and detect the object within the preset distance. The second sensors can employ the proximity sensors disposed within the preset distance from the two or more microphones and locating the object in the preset distance. A number of second sensors equal to the number of microphones can be disposed in the preset distance from the two or more microphones, and detect the object in the preset distance. For example, the second sensor disposed at the top of the electronic device can be disposed in the preset distance from the microphone at the same top side and detect whether the object is placed in a preset distance. The second sensor can light the infrared LED in its light emitting part, and detect whether the object is placed in the preset distance by detecting the infrared LED reflected from the ambient object through its light receiving part. The second sensor can operate when at least one of the two or more first sensors detect the charge amount over the preset value. The second sensor may be deactivated and then reactivated when the first sensor detects the charge amount over the preset value.

At operation 703, the electronic device determines whether one of the two or more second sensors in the preset distance from the two or more microphones detects the object in the preset distance. For example, when the second sensors are disposed at the top and the bottom of the electronic device respectively, the electronic device can detect the object around the microphones by activating the second sensor in the preset distance from the first microphone and the second sensor in the preset distance from the second microphone. Similarly, when the user's mouth is near the first microphone, the second sensor in the preset distance from the first microphone can detect the object in the preset distance.

When one of the two or more second sensors detects the object in the preset distance at operation 703, the electronic device operates the two or more microphones at operation 704. The two or more microphones do not operate until one of the second sensors detects the object in the preset distance.

At operation 705, the electronic device receives the voice through one microphone disposed in the preset distance from the second sensor detecting the object in the present distance. Two or more microphones can be employed to receive the voice in the preset distance from the second sensors respectively. The microphones can be disposed in the preset distance from the two or more second sensors respectively, and one of the two or more microphones, disposed in the preset distance from the second sensor detecting the object can receive the ambient voice. For example, if the electronic device includes the microphones at the top and the bottom respectively, then when the second sensor in the preset distance from the microphone at the top detects the object, the microphone at the top can receive the voice around the top side. One of the two or more microphones in the preset distance from the second sensor detecting the object in the preset distance can primarily receive the voice. For example, the microphone at the top can chiefly receive the voice.

At operation 706, the electronic device analyzes the detected voice and performs the preset operation according to the command corresponding to the detected voice. The electronic device can recognize the user's voice and conduct the preset operation according to the command corresponding to the detected voice. In the related art, the user needs to select and execute the application of the voice recognition in order to recognize the voice in the electronic device. The electronic device according to the related art receives from the user the application execution request for the voice recognition and then recognizes the voice from the user only when the corresponding application is executed. However, as described herein, although a separate application is not executed in the present electronic device, the first sensor and the second sensor operate and the microphone receiving the user's voice most among the two or more microphones of the electronic device can receive the user voice. As a result, the user can perform his/her intended operation in the electronic device by merely inputting the voice as defined in the electronic device without an additional interaction.

At operation 707, the electronic device determines whether one of the two or more second sensors excluding the second sensor detecting the object in the preset distance detects the object in the preset distance. The electronic device detects the microphone closest to the user's mouth which produces the voice, in real time, without fixing the main microphone capable of receiving the user's voice most.

When one of the second sensors excluding the second sensor detecting the object in the preset distance, detects the object in the preset distance at operation 707, the electronic device returns at operation 704. The electronic device can determine whether at least one second sensor excluding the second sensor disposed in the preset distance from the microphone receiving the voice detects the object in the preset distance. When at least one second sensor excluding the second sensor disposed in the preset distance from the microphone receiving the voice detects the object in the preset distance, the microphone disposed in the preset distance from the second sensor detecting the object in the preset distance can receive the voice. The electronic device can change the main microphone capable of receiving more user voice, without having to fix the main microphone and the sub microphone among the two or more microphones.

When one of the second sensors excluding the second sensor detecting the object in the preset distance detects no object in the preset distance at operation 707, the electronic device finishes this process.

Figure 8:
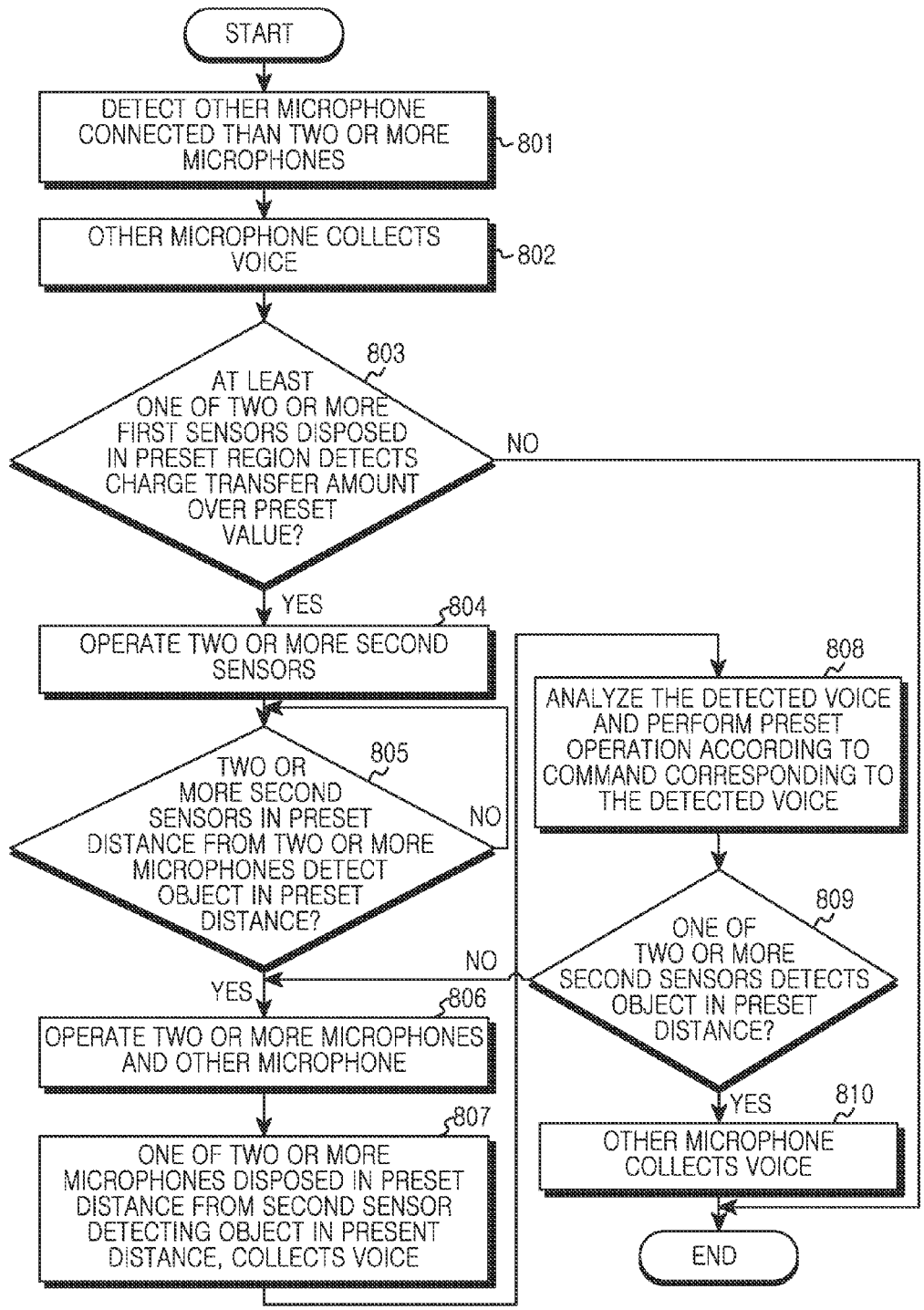
FIG. 8 illustrates operations of an electronic device connected with another microphone according to an embodiment of the present disclosure.

FIG. 8 is a flowchart of the operations of the electronic device connected with another microphone according to an embodiment of the present disclosure.

Referring to FIG. 8, the electronic device detects other microphone connected to the electronic device at operation 801. The electronic device can send the voice and the sound to the speaker of the earphone or the headset through the cable of the earphone or the headset, and receive the user's voice during the call using the microphone of the earphone or the headset.

At operation 802, the electronic device detecting the other microphone can receive the voice using the other microphone. The electronic device detecting the connected earphone or headset can determine whether the first sensors in the left and right outer shells detect the amount of the charge transfer over the preset value. The electronic device can determine whether the one or more first sensors being the grip sensors detect the amount of the charge transfer over the preset value from the outside to the inside of the electronic device. Upon detecting the amount of the charge transfer over the preset value, the electronic device can receive the voice using the microphone of the connected earphone or headset. In The electronic device can receive the user's voice around the microphone using the microphone of the earphone or the headset. Concurrently, the electronic device can cancel the noise around the microphones by activating its two or more microphones. The electronic device can receive the user's voice around the microphone chiefly using the microphone of the earphone or the headset, and cancel the noise near the microphones chiefly using the two or more microphones.

At operation 803, the electronic device determines whether at least one of the two or more first sensors disposed in the preset region detects the amount of the charge transfer over the preset value. The electronic device can determine whether the two or more first sensors being the grip sensors detect the amount of the charge transfer over the preset value from the outside to the inside of the electronic device. For example, when the user holds the electronic device in the hand, the electronic device can detect the amount of the charge transfer over the preset value from the outside to the inside. When another conductive object besides the user's hand touches the first sensor, the electronic device cannot detect the amount of the charge transfer from the outside to the inside of the electronic device and thus does not operate.

When the electronic device detects the amount of the charge transfer over the preset value at operation 803, the electronic device operates the two or more second sensors at operation 804. The second sensors can be disposed within the preset distance from the two or more microphones and detect the object within the preset distance. The second sensors can employ the proximity sensors disposed within the preset distance from the two or more microphones and locating the object in the preset distance. A number of the second sensors equal to the number of microphones can be disposed in the preset distance from the two or more microphones, and detect the object in the preset distance. For example, the second sensor disposed at the top of the electronic device can be disposed in the preset distance from the microphone at the same top side and detect whether the object is placed in a preset distance.

At operation 805, the electronic device determines whether one of the two or more second sensors in the preset distance from the two or more microphones detects the object in the preset distance. For example, when the second sensors are disposed at the top and the bottom of the electronic device respectively, the electronic device can detect the object near the microphones by activating the second sensor in the preset distance from the first microphone and the second sensor in the preset distance from the second microphone. Similarly, when the user's mouth is near the first microphone, the electronic device can detect the object in the preset distance from the second sensor in the preset distance from the first microphone.

When one of the two or more second sensors detects the object in the preset distance at operation 805, the electronic device operates the two or more microphones and the other microphone at operation 806. The two or more microphones may be activated when one of the second sensors detects the object in the preset distance.

At operation 807, the electronic device receives the voice through one of the two or more microphones disposed in the preset distance from the second sensor detecting the object in the present distance. Two or more microphones can be used in the preset distance from the second sensors respectively so as to receive the voice. The microphones can be disposed in the preset distance from the two or more second sensors respectively, and one of the two or more microphones, disposed in the preset distance from the second sensor detecting the object can receive the voice. For example, if the electronic device includes the microphones at the top and the bottom respectively, then when the second sensor in the preset distance from the microphone at the top detects the object, the microphone at the top can receive the voice around the top side. One of the two or more microphones, disposed in the preset distance from the second sensor detecting the object in the preset distance can primarily receive the voice. The microphone at the top can chiefly receive the voice.

At operation 808, the electronic device analyzes the detected voice and performs the preset operation according to the command corresponding to the detected voice. The electronic device can recognize the user's voice and conduct the preset operation according to the command corresponding to the detected voice. In the related art, the user needs to select and execute the application of the voice recognition in order to recognize the voice in the electronic device. The electronic device according to the related art receives from the user the application execution request for the voice recognition and then recognizes the voice from the user only when the corresponding application is executed. However, although a separate application is not executed in the electronic device as described herein, the first sensor and the second sensor operate and accordingly the microphone receive the user's voice most among the two or more microphones of the electronic device can receive the user voice. Accordingly, the user can perform the intended operation in the electronic device by merely inputting the voice as defined in the electronic device without an additional interaction.

At operation 809, the electronic device determines whether one of the two or more second sensors detects the object. The electronic device detects the microphone closest to the user's mouth which produces the voice, in real time, without fixing the main microphone capable of receiving the user's voice most.

When one of the second sensors other than the second sensor detecting the object in the preset distance detects the object at operation 809, the electronic device returns at operation 806. The electronic device can determine whether at least one second sensor excluding the second sensor disposed in the preset distance from the microphone receiving the voice detects the object in the preset distance. When at least one second sensor other than the second sensor disposed in the preset distance from the microphone receiving the voice detects the object in the preset distance, the microphone disposed in the preset distance from the second sensor detecting the object in the preset distance can receive the voice. The electronic device can change the main microphone capable of receiving more user voice, without having to fix the main microphone and the sub microphone among the two or more microphones.

When one of the second sensors detects no object in the preset distance at operation 809, the electronic device receives the voice using the other microphone at operation 810. The electronic device can receive the voice using the other microphone included in, for example, the earphone or the headset.

Figure 9:
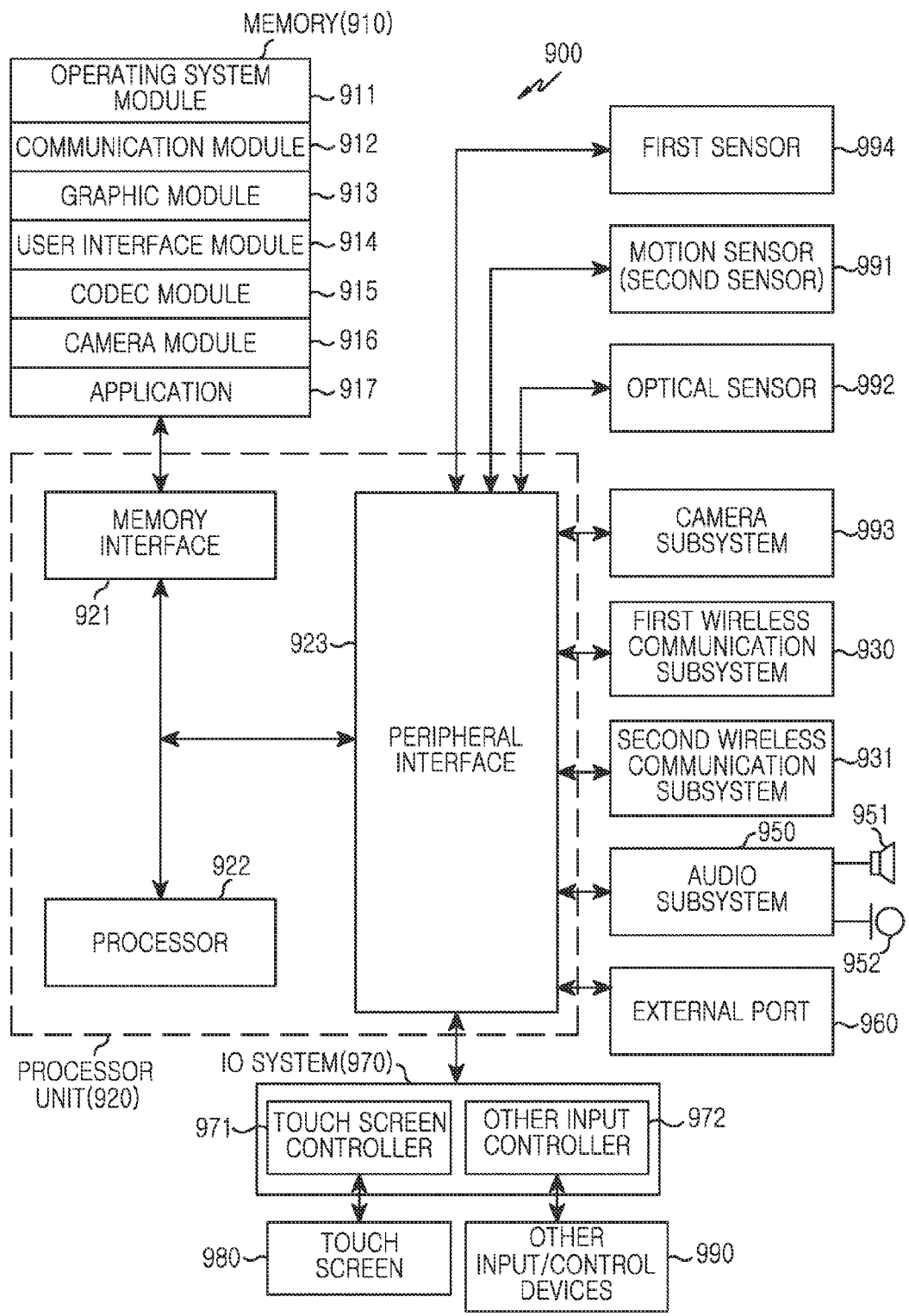
FIG. 9 illustrates an electronic device according to an embodiment of the present disclosure.

FIG. 9 is a block diagram of an electronic device according to an embodiment of the present disclosure.

Referring to FIG. 9, the electronic device 900 can be a portable electronic device such as portable terminal, mobile phone, mobile pad, media player, tablet computer, handheld computer, or Personal Digital Assistant (PDA). The electronic device 900 may be a portable electronic device combining two or more functions of those devices.

The electronic device 900 includes a memory 910, a processor unit 920, a first wireless communication subsystem 930, a second wireless communication subsystem 931, an external port 960, an audio subsystem 950, a speaker 951, a microphone 952, an Input Output (IO) system 970, a touch screen 980, and other input or control devices 990. A plurality of memories 910 and a plurality of external ports 960 can be used.

The processor unit 920 can include a memory interface 921, one or more processors 922, and a peripheral interface 923. In some cases, the processor unit 920 may be referred to as the processor.

The processor 922 performs various functions for the electronic device 900 by running various software programs, and processes and controls voice communication and data communication. In addition to such typical functions, the processor 922 also executes a particular software module (instruction sets) stored in memory 910 and performs various particular functions corresponding to the module. The processor 922 carries out methods according to embodiments of the present disclosure in association with the software modules stored in the memory 910.

The processor 922 can include one or more data processors, an image processor, or a codec. The data processor, the image processor, or the coded may be provided separately. Alternatively, the processor 922 may include a plurality of processors for performing different functions. The peripheral interface 923 connects the IO subsystem 970 and various peripherals of the electronic device 900 with the processor 922 and the memory 910 (through the memory interface 921).

The various components of the electronic device 900 can be coupled using one or more communication buses or one or more stream lines.

The external port 960 connects the portable electronic device to other electronic devices directly or indirectly via a network (e.g., Internet, intranet, and wireless LAN). The external port 960 can be, for example, but not limited to, a Universal Serial Bus (USB) port or an IEEE 1394 port.

A motion sensor 991, a first sensor 994, and an optical sensor 992 are coupled to the peripheral interface 923 to allow various functions. For example, the motion sensor 991, the first sensor 994, and the optical sensor 992 are coupled to the peripheral interface 923 to detect the motion of the electronic device, the amount of the charge transfer, and the light from the outside. In addition to these sensors, a positioning system and other sensors such as temperature sensor or bionic sensor can be coupled to the peripheral interface 923 to perform their functions. The first sensor 994 is disposed in the preset region to detect the amount of the charge transfer over the preset value, and is operable even in the deep-sleep mode. When the first sensor 994 detects the amount of the charge transfer over the preset value, the motion sensor 991 disposed in the preset distance from the two or more microphones locates the object in the preset distance. The motion sensor 991 operates when at least one of the two or more first sensors 994 detects the amount of the charge transfer over the preset value. The optical sensor 992 can employ a Charged Coupled Device (CCD) or a Complementary Metal-Oxide Semiconductor (CMOS) device.

A camera subsystem 993 can perform camera functions such as photo and video clip recording.

The communication function is conducted through the one or more wireless communication subsystems 930 and 931. The wireless communication subsystems 930 and 931 can include a radio frequency receiver and transmitter and/or an optical (e.g., infrared light) receiver and transmitter. The first wireless communication subsystem 930 and the second wireless communication subsystem 931 can be distinguished based on a communication network of the electronic device 900. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wi-Fi network, a WiMax network and/or a Bluetooth network. The first wireless communication subsystem 930 and the second wireless communication subsystem 931 may be integrated into a single wireless communication subsystem.

The audio subsystem 950 can be coupled to the speaker 951 and the microphone 952 to process audio stream input and output for voice recognition, voice reproduction, digital recording, and telephone function. The audio subsystem 950 communicates with the user through the speaker 951 and the microphone 952. The audio subsystem 950 receives a data signal through the peripheral interface 923 of the processor unit 920 and converts the received data signal to an electric signal. The converted electric signal is fed to the speaker 951. The speaker 951 converts the electric signal to a sound wave audible by the user and outputs the sound wave. The microphone 952 converts the sound wave from the user or other sound sources to an electric signal. The microphone 952 is disposed in the preset distance from the second sensor locating the object in the preset distance and receives the voice. The microphone 952 operates when at least one of the two or more second sensors locates the object in the preset distance. The audio subsystem 950 receives the converted electric signal from the microphone 952. The audio subsystem 950 converts the received electric signal to the audio data signal and sends the converted audio data signal to the peripheral interface 923. The audio subsystem 950 can include an attachable and detachable earphone, headphone, or headset.

The IO subsystem 970 can include a touch screen controller 971 and/or another input controller 972. The touch screen controller 971 can be coupled to the touch screen 980. The touch screen 980 and the touch screen controller 971 can detect the contact and the motion or lack thereof using, but not limited to, capacitive, resistive, infrared, and surface sound wave techniques for determining one or more contact points with the touch screen 980 and a multi-touch detection technique including various proximity sensor arrays or other elements. The other input controller 972 can be coupled to the other input/control devices 990. The other input/control devices 990 can employ one or buttons, a rocker switch, a thumb wheel, a dial, a stick, and/or a pointer such as stylus.

The touch screen 980 provides an I/O interface between the electronic device 900 and the user. The touch screen 980 forwards the user's touch input to the electronic device 900. The touch screen 980 also functions as a medium for displaying the output of the electronic device 900 to the user. The touch screen 980 represents a visual output to the user. Such a visual output can be represented as text, graphic, video, and a combination of these.

The touch screen 980 can employ various displays, examples of which include, but are not limited to, a Liquid Crystal Display (LCD), an LED, a Light emitting Polymer Display (LPD), an Organic LED (OLED), an Active Matrix OLED (AMOLED) or a Flexible LED (FLED).

The memory 910 can be coupled to the memory interface 921. The memory 910 can include fast Random Access Memory (RAM) such as one or more magnetic disc storage devices and/or non-volatile memory, one or more optical storage devices, and/or a flash memory (e.g., NAND and NOR).

The memory 910 stores software. Software components include an operating system module 911, a communication module 912, a graphic module 913, a user interface module 914, a MPEG module 915, a camera module 916, and one or more application modules 917. The module being the software component can be represented as a set of instructions, and thus the module can be referred to as an instruction set. The module may be referred to as a program. The operating system software 911 (the embedded operating system such as WINDOWS, LINUX, Darwin, RTXC, UNIX, OS X, or VxWorks) includes various software components for controlling general system operations. These include, for example, memory management and control, storage hardware (device) control and management, and power control and management. The operating system software 911 processes the normal communication between various hardware (devices) and software components (modules).

The communication module 912 allows communication with other electronic devices such as a computer, a server, and/or a portable terminal, through the wireless communication subsystems 930 and 931 or the external port 960.

The graphic module 913 includes various software components for providing and displaying graphics on the touch screen 980. The term 'graphics' encompasses text, web page, icon, digital image, video, and animation. The touch screen 980 displays a message inquiring about a smart rotation function and receives a certain region selected in the message.

The user interface module 914 includes various software components relating to a user interface. The user interface module 914 is involved in the status change of the user interface or the condition of the user interface status change.

The codec module 915 can include software components relating to video file encoding and decoding. The codec module 915 can include a video stream module such as MPEG module and/or H204 module. The codec module 915 can include various audio file CODEC modules for AAA, AMR, and WMA. The codec module 915 includes the instruction sets corresponding to the methods of the present disclosure as described herein.

The camera module 916 includes camera related software components allowing camera related processes and functions.

The application module 917 includes a browser, an e-mail, an instant message, a word processing, keyboard emulation, an address book, a touch list, a widget, Digital Rights Management (DRM), voice recognition, voice reproduction, a position determining function, and a location based service.

The various functions of the electronic device 900 as stated above and to be explained, can be executed by hardware and/or software and/or their combination including one or more stream processing and/or Application Specific Integrated Circuits (ASICs).

Figure 10A:
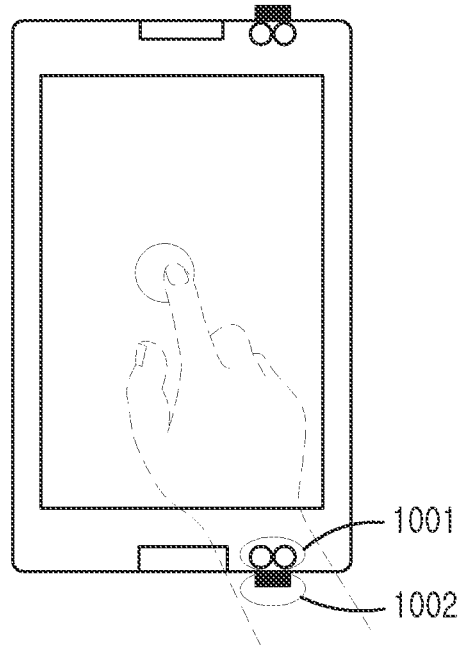
FIGS. 10A to 10C illustrate electronic devices for preventing voice recognition malfunction according to an embodiment of the present disclosure.
Figure 10B:
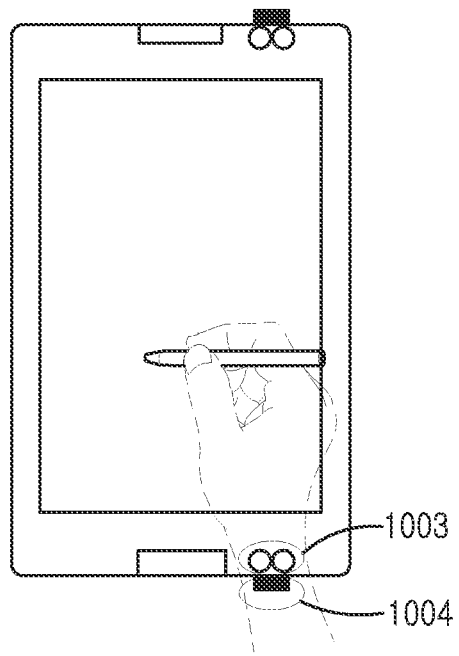
Figure 10C:
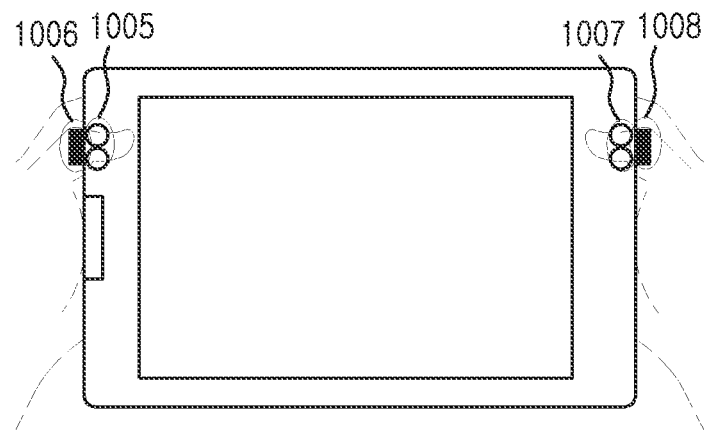

FIGS. 10A to 10C depict electronic devices for preventing voice recognition malfunction according to an embodiment of the present disclosure.

Referring to FIG. 10A, the electronic device can terminate the voice reception for the voice recognition while the touch is input onto the touch screen. When receiving information from an input means through the touch onto the touch screen of the electronic device, a proximity sensor 1001 at the bottom of the electronic device can recognize the input means and a microphone 1002 disposed in a preset distance from the proximity sensor 1001 can recognize the voice. For example, as the touch is input from the user, the proximity sensor 1001 may recognize a user's arm and the microphone 1002 disposed in the preset distance from the proximity sensor 1001 may recognize the voice. In this respect, the electronic device receives the last touch input through the touch screen and then recognizes the voice after a preset time. For example, the electronic device can receive the last touch input from the user through the touch screen and then recognize the voice after a preset time of two seconds passes.

Referring to FIG. 10B, the electronic device can terminate the voice reception for the voice recognition while hovering is input over the touch screen. When receiving the hovering from the input means through the touch screen of the electronic device, a proximity sensor 1003 at the bottom of the electronic device can recognize the input means and a microphone 1004 disposed in a preset distance from the proximity sensor 1003 can recognize the voice. For example, as the hovering is input from the user, the proximity sensor 1003 may recognize the user's arm and the microphone 1004 disposed in the preset distance from the proximity sensor 1003 may recognize the voice. In this respect, the electronic device can receive the last hovering input through the touch screen, and then recognize the voice after a preset time. For example, the electronic device can receive the last hovering input from the user through the touch screen, and then recognize the voice after the preset time of two seconds passes.

Referring to FIG. 10C, the electronic device may terminate the voice receiving in a landscape mode. More specifically, when operating in the landscape mode, proximity sensors 1005 and 1007 at the top and the bottom of the electronic device can detect the object microphones 1006 and 1008 disposed in a preset distance from the proximity sensors 1005 and 1007 can recognize the voice. For example, when the user grips the electronic device in the landscape mode, disadvantageously, the proximity sensors 1005 and 1007 at the top and the bottom of the electronic device may detect the user's hand and the microphones 1006 and 1008 disposed in the preset distance from the proximity sensors 1005 and 1007 can recognize the voice. In this respect, upon detecting the landscape grip, the electronic device terminates the voice recognition and thus prevents the malfunction.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method of an electronic device, the method comprising:
   detecting, by at least one first sensor a charge transfer;
   when an amount of the charge transfer is greater than a preset value, detecting, by one of two or more second sensors disposed at a position adjacent to each of two or more microphones, an object in a preset distance from the electronic device; and
   receiving a voice by a microphone disposed in a position adjacent to the one of the two or more second sensors detecting the object.

2. The operating method of claim 1, wherein the at least one first sensor operates while the electronic device is in a deep-sleep mode.

3. The operating method of claim 1, wherein the at least one first sensor is a grip sensor.

4. The operating method of claim 1, wherein each of the two or more second sensors is a proximity sensor.

5. The operating method of claim 1, further comprising:
   when the at least one first sensor detects the amount of the charge transfer greater than the preset value, operating the two or more second sensors.

6. The operating method of claim 1, further comprising:
   when the one of the two or more second sensors detects the object, operating the two or more microphones.

7. The operating method of claim 1, wherein the microphone disposed in the position adjacent to the one of the two or more second sensors detecting the object, primarily receives the voice.

8. The operating method of claim 1, wherein at least one microphone, other than the microphone disposed in the position adjacent to the one of the two or more second sensors detecting the object of the two or more microphones, primarily cancels noise.

9. The operating method of claim 1, further comprising:
   analyzing the detected voice;
   recognizing a command corresponding to the detected voice; and
   performing an operation according to the recognized command.

10. The operating method of claim 9, further comprising:
    when a voice reception condition is satisfied in the electronic device, automatically running an application for the voice recognition in a background of the electronic device; and
    executing the command corresponding to the received voice.

11. The operating method of claim 1, further comprising:
    determining whether at least one second sensor other than the one of the two or more second sensors disposed in the position adjacent to the microphone receiving the voice, detects an object in the preset distance from the electronic device.

12. The operating method of claim 11, further comprising:
    when the at least one second sensor other than the one of two or more second sensors disposed in the position adjacent to the microphone receiving the voice detects the object, receiving the voice at the microphone disposed in the position adjacent to the one of the two or more second sensors detecting the object.

13. An electronic device comprising:
    at least one first sensor configured to detect an amount of charge transfer greater than a preset value;
    two or more second sensors disposed at positions adjacent to each of two or more microphones and configured to detect an object in a preset distance from the electronic device when the at least one first sensor detects the amount of the charge transfer greater than the preset value; and
    two or more microphones, wherein a microphone of the two or more microphones disposed in a position adjacent to a second sensor of the two or more second sensors detecting the object, is configured to receive a voice.

14. The electronic device of claim 13, wherein the at least one first sensor is configured to operate while the electronic device is in a deep-sleep mode.

15. The electronic device of claim 13, wherein the at least one first sensor is a grip sensor.

16. The electronic device of claim 13, wherein each of the two or more second sensors is a proximity sensor.

17. The electronic device of claim 13, wherein the two or more second sensors are configured to operate when the at least one first sensor detects the amount of the charge transfer greater than the preset value.

18. The electronic device of claim 13, wherein the two or more microphones are configured to operate when the one of the two or more second sensors detects the object.

19. The electronic device of claim 13, wherein the microphone disposed in the position adjacent to the second sensor detecting the object, is configured to primarily receive the voice.

20. The electronic device of claim 13, wherein at least one microphone other than the microphone disposed in the position adjacent to the second sensor detecting the object of the two or more microphones, is configured to primarily cancel noise.

21. The electronic device of claim 13, further comprising:
a processor unit configured to:
analyze the detected voice,
recognize a command corresponding to the detected voice, and
perform an operation according to the recognized command.

22. The electronic device of claim 21, wherein the processor unit is configured to:
when a voice reception condition is satisfied in the electronic device, automatically run an application for the voice recognition in a background of the electronic device; and
execute the command corresponding to the received voice.

23. The electronic device of claim 13, wherein at least one second sensor, other than the second sensor disposed in the position adjacent to the microphone receiving the voice is configured to determine whether an object is detected in the preset distance from the electronic device.

\* \* \* \* \*